US010427070B1

(12) United States Patent
Cagle

(10) Patent No.: US 10,427,070 B1
(45) Date of Patent: Oct. 1, 2019

(54) TRIPLE LAYER NON-PLUGGING SCREEN

(71) Applicant: William S. Cagle, Tulsa, OK (US)

(72) Inventor: William S. Cagle, Tulsa, OK (US)

(*) Notice: Subject to any disclaimer, the term of this patent is extended or adjusted under 35 U.S.C. 154(b) by 671 days.

(21) Appl. No.: 14/742,188

(22) Filed: Jun. 17, 2015

(51) Int. Cl.
*B01D 33/03* (2006.01)
*B01D 33/68* (2006.01)

(52) U.S. Cl.
CPC ......... *B01D 33/0376* (2013.01); *B01D 33/68* (2013.01)

(58) Field of Classification Search
CPC .... B01D 39/00; B01D 25/04; B01D 24/4694; B01D 39/10; B01D 39/12
See application file for complete search history.

(56) References Cited

U.S. PATENT DOCUMENTS

| | | |
|---|---|---|
| 4,033,865 A | 7/1977 | Derrick, Jr. |
| 5,256,292 A | 10/1993 | Cagle |
| 5,370,797 A | 12/1994 | Cagle |
| 5,814,218 A | 9/1998 | Cagle |
| 5,944,197 A * | 8/1999 | Baltzer et al. ............... 209/400 |
| 6,431,368 B1 | 8/2002 | Carr |
| 2003/0222032 A1* | 12/2003 | Tueshaus et al. ............ 210/767 |
| 2004/0101742 A1* | 5/2004 | Simpkins et al. ............. 429/44 |

* cited by examiner

*Primary Examiner* — Krishnan S Menon
*Assistant Examiner* — Waqaas Ali
(74) *Attorney, Agent, or Firm* — Gable Gotwals; Frank J. Catalano

(57) ABSTRACT

A triple layer non-plugging screen for use with a vibrating screening machine to filter particles from a liquid has an upper filtering layer made of warp and shute wires that intersect to form an array of small openings, a lower strengthening layer having an array of large openings, and an anti-plugging layer. The anti-plugging layer is sandwiched between the upper filtering and lower strengthening layers and is made of warp and shute wires that intersect to form an array of openings. The upper filtering and anti-plugging layers are oriented within the screen so that at least one of the warp and shute wires of the anti-plugging layer obstructs at least some of the openings in the upper filtering layer. This reduces the likelihood of entrapment of undesirable particles in the obstructed openings of the upper filtering layer.

14 Claims, 5 Drawing Sheets

(Enlarged)

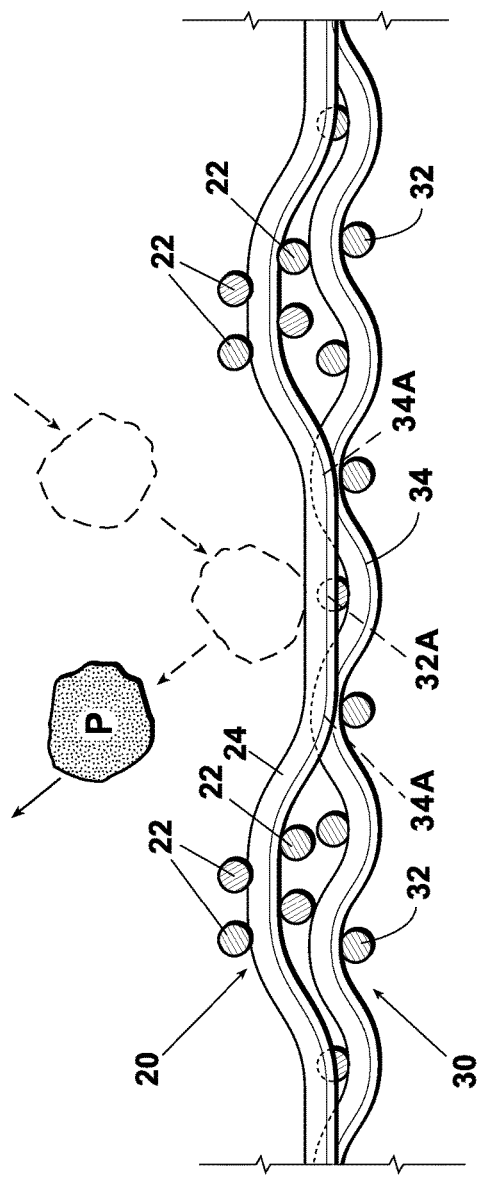
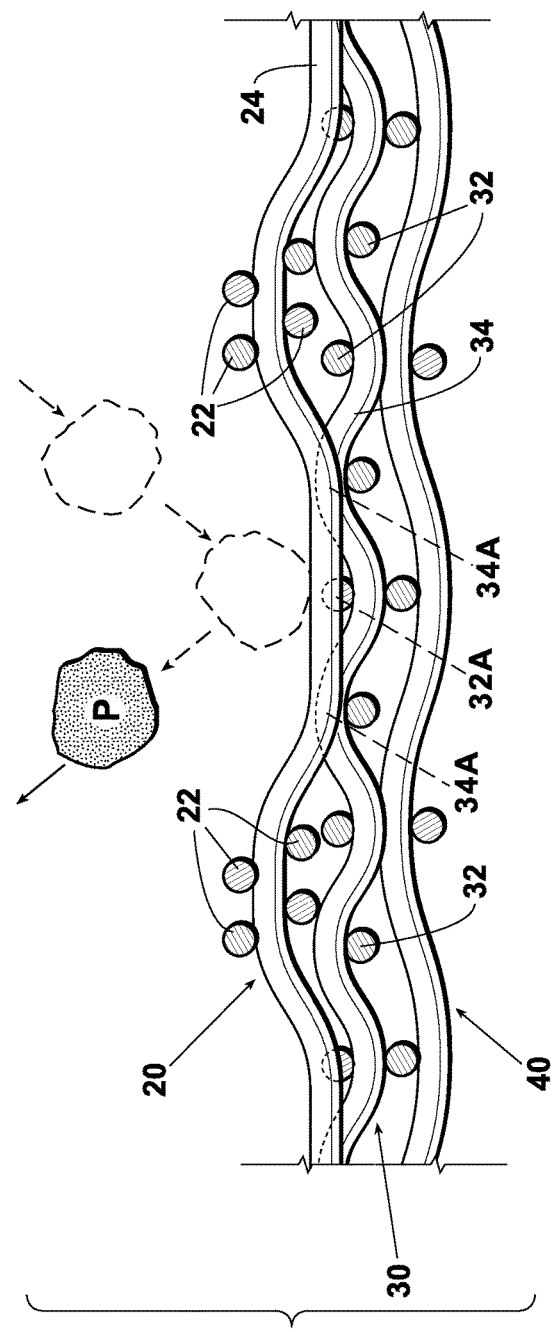
Fig. 8
Fig. 9

TRIPLE LAYER NON-PLUGGING SCREEN

BACKGROUND OF THE INVENTION

This invention relates generally to screens and more particularly concerns screens used in vibrating screening machines to remove undesirable particles from a liquid such as oil well drilling fluids.

The factors of primary importance in screens are particle separation, fluid throughput or conductance, and screen life. Finer particle separation results in a higher percentage of impurities being removed from the screened fluid. Higher conductances are desirable because more fluid can be processed per square foot of screen area, thereby improving treatment efficiency and reducing costs. As an example, doubling the conductance doubles the liquid throughput. Longer screen life means that the screens have to be replaced less frequently, thereby saving time and money.

Since the mid-1970s, the trend in the vibrating screen industry has been to decrease the diameter of the wires comprising the screens in order to increase conductance. The result has been finer separation and higher conductance but shorter screen life. Undesirable particles can still become trapped among the wires of the screen, reducing its conductance. In addition, screens made of thinner wires have less resistance because thinner wires are more prone to deformation from parallel. This non-parallel deformation creates openings in the screen that have widths that are either smaller or greater than expected and allows undesirable particles to pass through the screen.

Therefore, it is an object of this invention to provide a triple-layer screen where at least one of the layers uses coarser wire than conventional screens. It is another object of this invention to maximize conductance through the screen while maintaining screen-life that is at least comparable to conventional screens. It is another object of this invention to reduce the number of undesirable particles that become entrapped in the upper layer of the screen, further enhancing the screen's conductance. It is another object of this invention to lengthen the effective life of the screen.

SUMMARY OF THE INVENTION

In accordance with the invention, a screen for use with a vibrating screening machine to filter particles from a liquid is presented. The screen has an upper filtering layer, an anti-plugging layer, and a lower strengthening layer. The upper filtering layer is made of warp and shute wires that intersect to form an array of small openings. The lower strengthening layer has an array of large openings. The anti-plugging layer is sandwiched between the upper filtering and lower strengthening layers and is made of warp and shute wires that intersect to form an array of openings. The upper filtering and anti-plugging layers are oriented within the screen so that at least one of the warp and shute wires of the anti-plugging layer obstructs at least some of the openings in the filtering layer. This reduces the likelihood of entrapment of undesirable particles in the obstructed openings of the filtering layer.

BRIEF DESCRIPTION OF THE DRAWINGS

Other objects and advantages of the invention will become apparent upon reading the following detailed description and upon reference to the drawings in which:

FIG. 8 is a partial cross-sectional view of the upper filtering layer and the anti-plugging layer of the screen of FIG. 1; and FIG. 9 is a partial cross-sectional view of the upper filtering layer, anti-plugging layer, and lower strengthening layer of the screen of FIG. 1.

While the invention will be described in connection with a preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENTS

In accordance with the invention, a screen is provided for use with a vibrating screening machine. Drilling product or other liquid flows into the machine, through the screen to separate undesirable particles from the fluid stream, and out of the machine for additional treatment or processing. Collected undesirable particles are typically discharged from the machine to a separate holding tank for further treatment or disposal.

Figure 1:
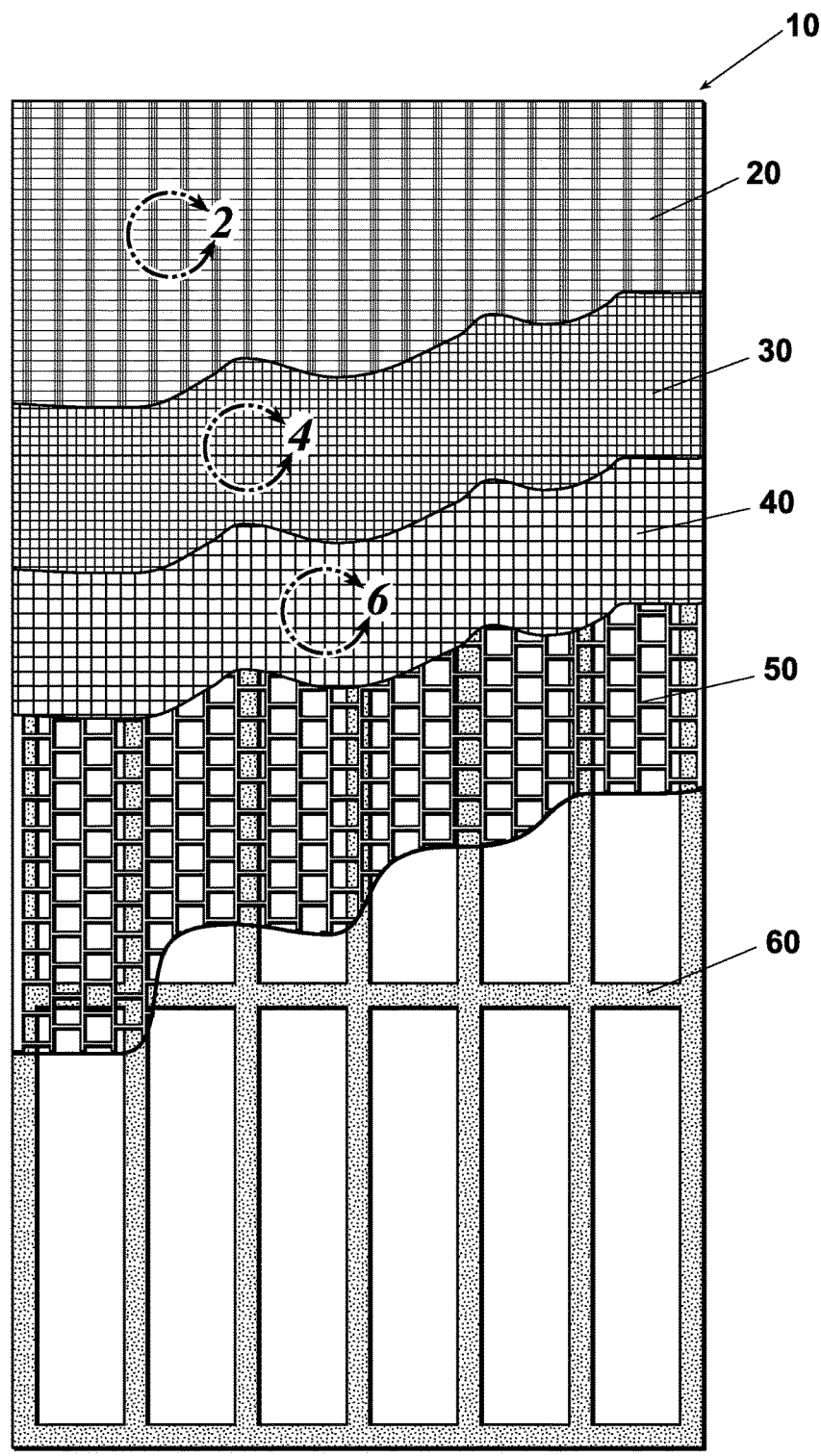
FIG. 1 is a top plan view of a preferred embodiment of the triple layer non-plugging screen, with part of the screen broken away.

Looking first at FIG. 1, the screen 10 has an upper filtering layer 20, an anti-plugging layer 30, and a lower strengthening layer 40, all supported by a perforated plate 50 and a frame 60. Various shapes and types of materials for the perforated plate 40 and the frame 50 are well known in the art, and any conventional perforated plate 40 and frame 50 may be used to support the inventive screen 10.

Figure 2:
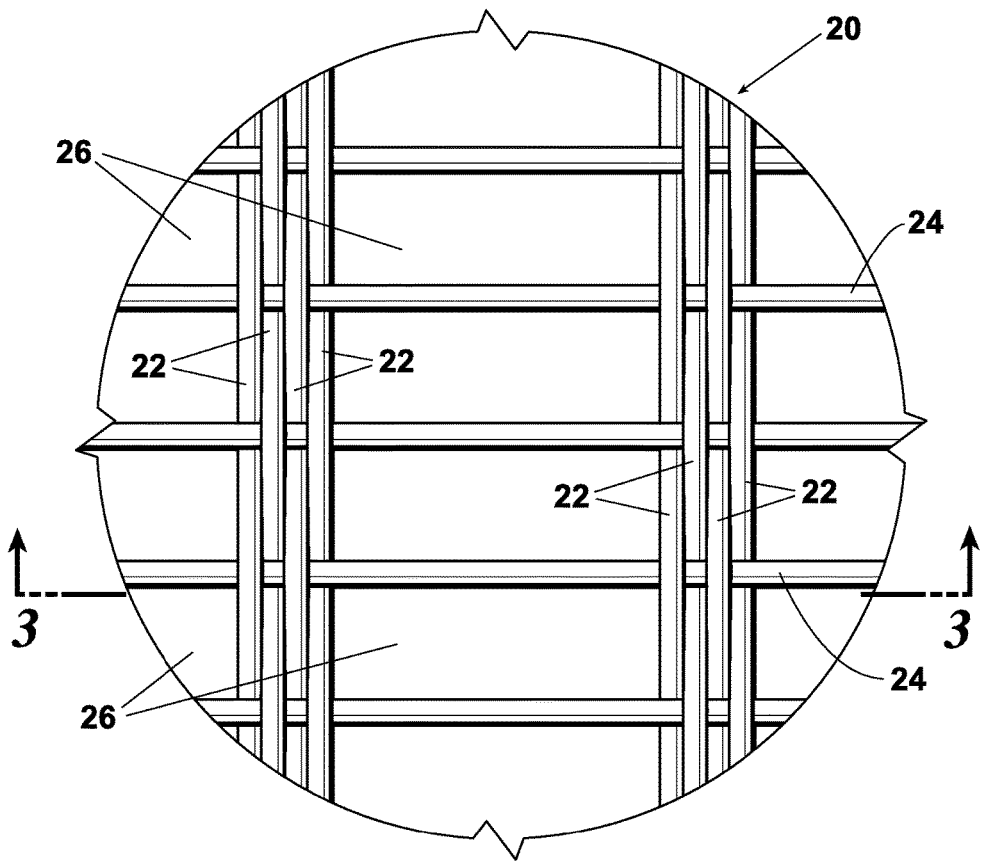
FIG. 2 is an enlarged fragmentary top plan view of the upper filtering layer of the screen of FIG. 1.
Figure 3:
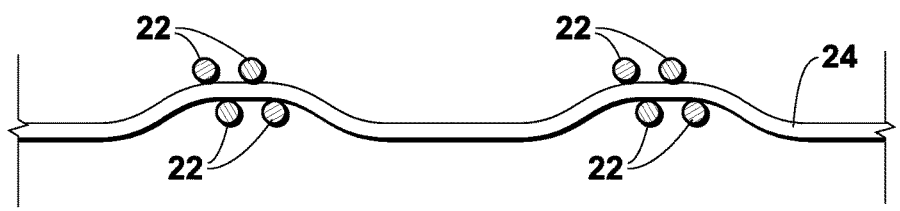
FIG. 3 is a cross-sectional view, taken along the line 3-3, of the upper filtering layer of FIG. 2.

Turning to FIG. 2 and FIG. 3, a typical upper filtering layer 20 is illustrated. The upper filtering layer 20 shown consists of a flat parallel array of warp wires 22 spaced at less than a preselected minimal linear dimension of undesirable particles. Shute wires 24, which run transverse to the warp wires 22, are interlaced with the warp wires 22 forming an array of small openings 26 and are secured in place by the warp wires 22. The small openings 26 may be rectangular with a length-to-width or aspect ratio that varies from about 10:1 to 20:1. This range of aspect ratios results in a screen with higher conductance than conventional screens. As the aspect ratio decreases below about 10:1, the conductance also decreases, which may result in unacceptable treatment efficiency and costs. If the aspect ratio were substantially above 20:1, the shute wires might become unstable and deform from parallel, thereby allowing undesirable particles to pass through the screen.

The spaces between parallel pairs of shute wires 24 may be equal and the spaces between parallel pairs of warp wires 22 may be equal, creating consistently sized openings 26 throughout the upper filtering layer. Alternatively, unequal spacings between either or both the warp and shute wires may be employed to create openings of different sizes within the upper filtering layer.

The warp and shute wires 22, 24 may be formed of metal, plastic, or any material suited to a particular application. Moreover, warp and shute wires 22, 24 could be of different materials, strengths, and hardness. The diameter of the warp and shute wires 22, 24 is at least approximately 0.00078 inches. Wire diameters less than about 0.00078 inches correspondingly shorten the life of the screen. The diameter of the shute wires 24 ranges from about 1.25 to about 1.7 times the diameter of the warp wires 22. If the shute wire 24 diameter is less than about 1.25 times the warp wire 22 diameter, the warp and shute wires 22, 24 cannot be woven together to form the upper filtering layer 20. Conversely, if the shute wire 24 diameter is more than about 1.7 times the diameter of the warp wires 22, the conductance of the screen 10 will be too low for effective use in the field. Whatever the wire diameter, the range of ratios should be applied.

The distance between adjacent shute wires 24 is at least twice their diameter. If the distance between adjacent shute wires 24 is less than twice their diameter, the openings 26 of the upper filtering layer 20 are more likely to be obstructed by particles that are similar in size and shape to the openings, i.e., near-size particles. The warp wires 22 are organized in bundles and woven through the shute wires 24 in an opposite over-under pattern in either a plain weave, where each warp wire and shute wire pass over one and under the next adjacent wire, or a twill weave, where each warp wire and each shute wire pass successively over two and under the next adjacent pair of wires. The minimum tensile strength of the warp wires 22 of the upper filtering layer 20 ranges from about 15 pounds per inch of cloth to about 20 pounds per inch of cloth. Field experience has shown that this minimum range provides a screen life that is acceptable for practical use.

As shown in FIG. 1, the anti-plugging layer 30 is sandwiched between the upper filtering layer 20 and the lower strengthening layer 40 of the screen 10. As further described below, the anti-plugging layer 30 is oriented so that at least one or more of the warp and shute wires in the anti-plugging layer 30 obstruct at least some of the openings in the upper filtering layer 20, thereby preventing the entrapment of near-size particles in the obstructed openings and improving the conductance of the screen 10.

Figure 4:
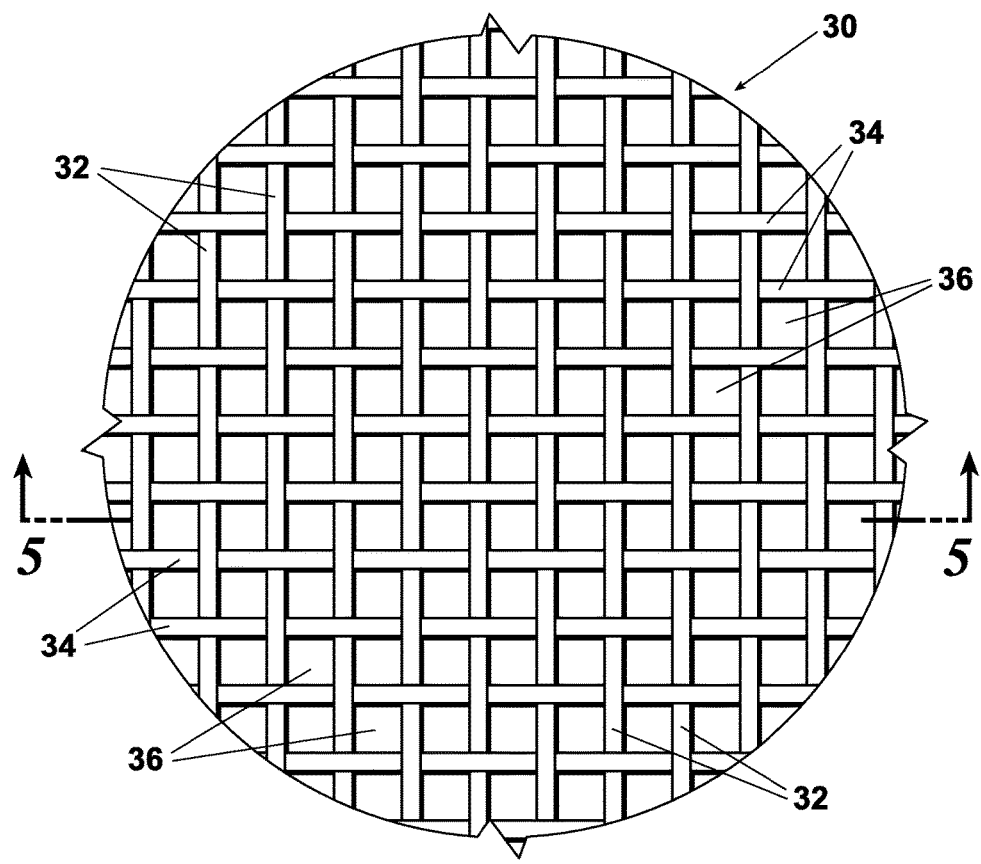
FIG. 4 is an enlarged fragmentary top plan view of the anti-plugging layer of the screen of FIG. 1.
Figure 5:
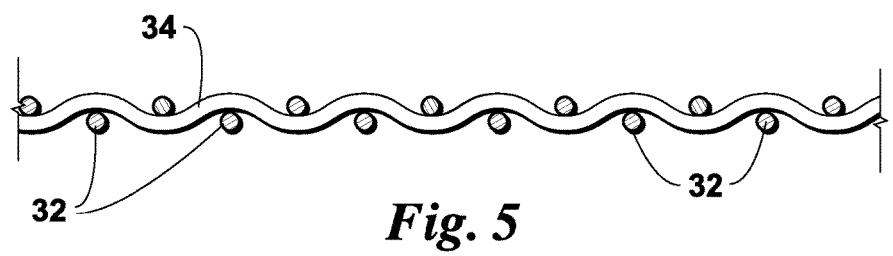
FIG. 5 is a cross-sectional view, taken along the line 5-5, of the anti-plugging layer of FIG. 4.

Looking at FIG. 4 and FIG. 5, the anti-plugging layer 30 consists of warp wires 32 and shute wires 34 that are woven together to form an array of openings 36. The openings 36 of the anti-plugging layer 30 may be substantially square, with the distance between two adjacent shute wires 34 and two adjacent warp wires 32 being at least two times their diameter. If the openings 36 between two adjacent shute wires 34 and two adjacent warp wires 32 is less than two times their diameters, then the screen is more likely to be obstructed by near-size particles. Alternatively, the anti-plugging layer may have rectangular openings, with the length of the openings being about 1.5 to about 2.5 times their width. This range of aspect ratios is selected to maximize conductance while ensuring that the warp and shute wires remain in their original positions. At some aspect ratio above 2.5, the anti-plugging layer becomes sleazy, i.e., the warp and shute wires do not stay in their original positions.

Figure 6:
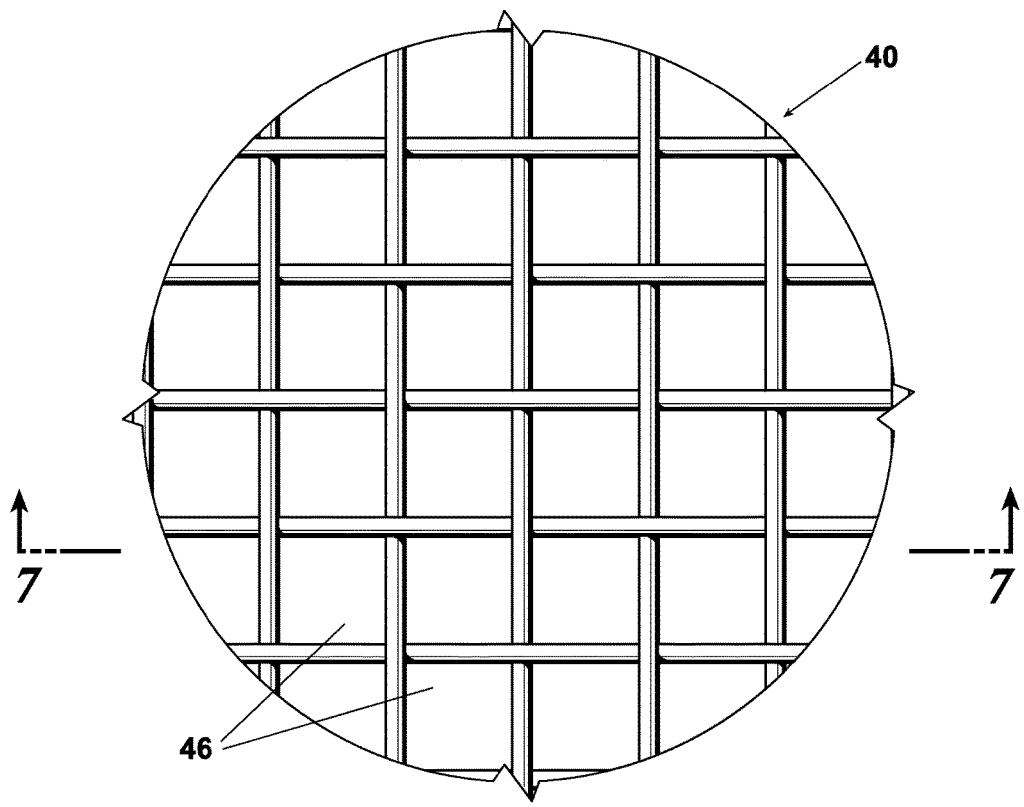
FIG. 6 is an enlarged fragmentary top plan view of the lower strengthening layer of the screen of FIG. 1.
Figure 7:
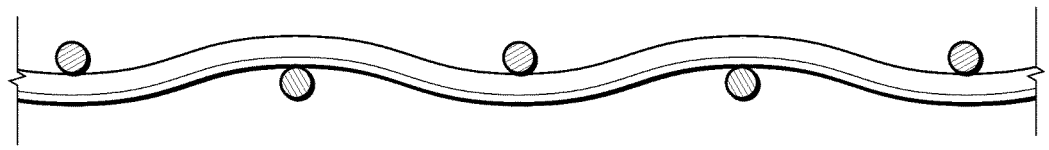
FIG. 7 is a cross-sectional view, taken along the line 7-7, of the lower strengthening layer of FIG. 6.

Turning now to FIG. 6 and FIG. 7, the lower strengthening layer 40 of the screen has an array of large openings 46 therethrough. Depending upon the particular screen application, this layer may have a mesh size that ranges from about 6 to about 46 openings per inch and may be tensile bolting cloth, market grade, or mill grade. This range of mesh size, which considers both the support provided to the screen by the lower strengthening layer and the conductance of the strengthening layer, is a practical range that was developed through experimentation. The lower strengthening layer provides support for the upper filtering and anti-plugging layers and is not responsible for filtering undesirable particles from the liquid.

As best seen in FIG. 8, the upper filtering layer 20 and anti-plugging layer 30 are oriented within the screen so that at least one of the warp and shute wires 32, 34 of the anti-plugging layer 30 obstructs at least some of the openings in the upper filtering layer 20. In addition, the warp and shute wires 32, 34 of the anti-plugging layer 30 extend into the same plane as the upper filtering layer 20. As a result, undesirable particles do not become lodged in the obstructed openings of the upper filtering layer 20, thereby increasing the overall conductance of the screen. For example, undesirable particle "P" cannot fit through the opening in the upper filtering layer 20 because the opening is partially obstructed by warp wire 32A and shute wire 34A in the anti-plugging layer 30. The openings in the anti-plugging layer 30 must be larger than the openings in the upper filtering layer 20 so that all of the particles that pass through the upper filtering layer 20 can also pass through the anti-plugging layer 30. If the particles passing through the upper filtering layer 20 were unable to pass through the anti-plugging layer 30, the trapped particles would collect between the two layers, fill up the space between the layers, and impede flow through the screen.

The off-set ratio is the size of the openings in the anti-plugging layer 30 to the size of the openings in the upper filtering layer 20. A smaller off-set ratio means that a greater percentage of the openings in the upper filtering layer 20 have at least one wire of the anti-plugging layer 30 beneath them and are therefore obstructed. As an example, the openings of the anti-plugging layer 30 may be approximately 1.2 times greater than the openings in the upper filtering layer 20. As the off-set ratio increases, a smaller percentage of the filtering openings have an anti-plugging wire beneath the opening.

As shown in FIG. 9, the openings in the lower strengthening layer 40 are larger than the openings in the upper filtering layer 20 and the anti-plugging layer 30. As a result, all of the particles that pass through the upper filtering and anti-plugging layers 20, 30 can also pass through the lower strengthening layer 40, and the lower strengthening layer 40 does not impede flow through the screen. Instead, as described above, it supports the other two layers of the screen.

While the invention has been described in relation to warp and shute wires using the established meaning of warp wires extending along the length of material being woven and shute wires extending across the width of the material, a reversal of these warp and shute relationships is fully within the scope of this invention.

Thus, it is apparent that there has been provided, in accordance with the invention, a screen that fully satisfies the objects, aims, and advantages set forth above. While the invention has been described in conjunction with a specific embodiment thereof, it is evident that many alternatives, modifications, and variations will be apparent to those skilled in the art and in light of the foregoing description. Accordingly, it is intended to embrace all such alternatives, modifications, and variations as fall within the spirit of the appended claims.

What is claimed is:

1. A screen for use with a vibrating screening machine to filter particles from a liquid, the screen comprising:
   an upper filtering layer comprising warp and shute wires defining an array of small openings therebetween, said warp wires in said upper filtering layer being organized in bundles;
   a lower strengthening layer defining an array of large openings therethrough; and
   an anti-plugging layer comprising warp and shute wires defining an array of openings therebetween, said anti-plugging layer being sandwiched between said upper filtering and lower strengthening layers, at least one of said warp wires and said shute wires of said anti-plugging layer obstructing at least some of the openings in said filtering layer to prevent entrapment of particles in said obstructed openings of said filtering layer wherein said warp wires in said upper filtering layer are organized in bundles.

2. A screen according to claim 1 wherein said warp and shute wires of said upper filtering layer have a diameter of at least 0.00078 inches.

3. A screen according to claim 1 wherein the diameter of said shute wires in said upper filtering layer is 1.25 to 1.7 times the diameter of said warp wires in said upper filtering layer.

4. A screen according to claim 3 wherein said warp and shute wires of said upper filtering layer have a diameter of at least 0.00078 inches.

5. A screen according to claim 1 wherein a distance between adjacent shute wires in said upper filtering layer is at least two times their diameter.

6. A screen according to claim 1 wherein said upper filtering layer has a tensile strength at least in a minimum range from 15 pounds per inch of cloth to 20 pounds per inch of cloth.

7. A screen according to claim 1 wherein said warp wires in said bundle are woven in an opposite over-under pattern in a plain weave.

8. A screen according to claim 1 wherein said warp wires in said bundle are woven in an opposite over-under pattern in a twill weave.

9. A screen according to claim 1 wherein said anti-plugging layer is comprised of a square mesh.

10. A screen according to claim 9 wherein a distance between two adjacent shute wires and two adjacent warp wires in said anti-plugging layer is at least two times their diameter.

11. A screen according to claim 1 wherein said anti-plugging layer is comprised of a rectangular mesh with an opening having a length and a width, the length being 1.5 to 2.5 times the width.

12. A screen according to claim 11 wherein a distance between the adjacent shute wires or the adjacent warp wires forming a long dimension of the rectangular mesh in said anti-plugging layer is at least two times their diameter.

13. A screen according to claim 1 wherein said strengthening layer has a mesh size that ranges from 6 to 46 openings per inch.

14. A screen according to claim 1 wherein said openings of said anti-plugging layer are approximately 1.2 times greater than said openings in said upper filtering layer, such that at least some of the openings in the upper filtering layer are obstructed by the anti-plugging layer.

* * * * *